(12) United States Patent  (10) Patent No.: US 9,325,912 B2
Hirasawa  (45) Date of Patent: Apr. 26, 2016

(54) EXPOSURE CONTROL UNIT, EXPOSURE CONTROLLING METHOD, AND IMAGE PICKUP UNIT

(71) Applicant: SONY CORPORATION, Minato-ku (JP)

(72) Inventor: Syouei Hirasawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/465,228

(22) Filed: Aug. 21, 2014

(65) Prior Publication Data
US 2015/0062414 A1  Mar. 5, 2015

(30) Foreign Application Priority Data
Aug. 30, 2013  (JP) .................................. 2013-179617

(51) Int. Cl.
*H04N 5/238* (2006.01)
*G03B 7/00* (2014.01)

(52) U.S. Cl.
CPC ................ *H04N 5/238* (2013.01); *G03B 7/003* (2013.01)

(58) Field of Classification Search
CPC .......... H04N 5/238; G03B 7/003; G03B 9/02; G03B 2207/00
USPC ............................................ 348/363; 396/242
See application file for complete search history.

(56) References Cited

U.S. PATENT DOCUMENTS 5,291,237 A * 3/1994 Tagami .................... G03B 7/16
396/166
5,999,752 A * 12/1999 Ueyama ................. G03B 7/097
396/170

* cited by examiner

*Primary Examiner* — Rochelle-Ann J Blackman
(74) *Attorney, Agent, or Firm* — Oblon, McClelland, Maier & Neustadt, L.L.P.

(57) ABSTRACT

An image processing apparatus including circuitry configured to cause an aperture diaphragm to move from a starting position toward first and second diaphragm positions of the aperture diaphragm such that the aperture diaphragm reaches the first diaphragm position at the beginning of an exposure period. The circuitry is further configured to cause the aperture diaphragm to move from the first diaphragm position to the second diaphragm position during the exposure period.

15 Claims, 12 Drawing Sheets

EXPOSURE CONTROL UNIT, EXPOSURE CONTROLLING METHOD, AND IMAGE PICKUP UNIT

CROSS REFERENCE TO RELATED APPLICATIONS

This application claims the benefit of Japanese Priority Patent Application JP 2013-179617 filed Aug. 30, 2013, the entire contents which are incorporated herein by reference.

BACKGROUND

The present disclosure relates to an exposure control unit and an exposure controlling method in which an aperture diaphragm is variably controlled to obtain an apodization effect, and an image pickup unit.

There is known a method of improving contrast of an image by providing, to an entrance pupil of an optical system, an apodization filter with transmittance high at its center and gradually decreasing toward its periphery. Moreover, there is a method of obtaining an effect (apodization effect) approximating to the apodization filter by variably controlling an aperture diaphragm. For example, Japanese Unexamined Patent Application Publication Nos. H10-333202 (refer to FIG. 2) and 2004-317650 propose a method of obtaining the apodization effect by closing an aperture diaphragm to a predetermined initial value in advance at the start of an exposure period and gradually opening the aperture diaphragm during exposure.

SUMMARY

In a case where an aperture diaphragm is variably controlled in the above-described manner, for example, a stepping motor may be used to drive the aperture diaphragm. However, when a diaphragm driving system with use of the stepping motor drives the aperture diaphragm, at the start of operation, it is difficult for the aperture diaphragm to operate at high speed due to an influence of an inertial force or a frictional force of the motor, or the like. Therefore, to secure a diaphragm driving amount necessary to produce the apodization effect, it is necessary to slow down shutter speed, and in a high-light environment such as sunny outdoors, it is difficult to perform suitable exposure unless an ND (Neutral Density) filter or the like is used. Moreover, there may be difficulty in use such as susceptibility to hand movement.

It is desirable to provide an exposure control unit and an exposure controlling method each of which is capable of obtaining an apodization effect even if shutter speed is increased, and an image pickup unit.

In a first aspect, an image processing apparatus includes circuitry configured to cause an aperture diaphragm to move from a starting position toward first and second diaphragm positions of the aperture diaphragm such that the aperture diaphragm reaches the first diaphragm position at the beginning of an exposure period. The circuitry is further configured to cause the aperture diaphragm to move from the first diaphragm position to the second diaphragm position during the exposure period.

In another aspect, an image processing system includes circuitry configured to cause an aperture diaphragm to move from a starting position toward first and second diaphragm positions of the aperture diaphragm such that the aperture diaphragm reaches the first diaphragm position at the beginning of an exposure period. The circuitry is further configured to cause the aperture diaphragm to move from the first diaphragm position to the second diaphragm position during the exposure period.

In another aspect, a method of an image processing apparatus for image capture if provided. The method includes causing, by circuitry of the image processing apparatus, an aperture diaphragm to move from a starting position toward first and second diaphragm positions of the aperture diaphragm such that the aperture diaphragm reaches the first diaphragm position at the beginning of an exposure period. The method further includes causing, by the circuitry, the aperture diaphragm to move from the first diaphragm position to the second diaphragm position during the exposure period.

In another aspect, a lens includes circuitry configured to cause an aperture diaphragm to move from a starting position toward first and second diaphragm positions of the aperture diaphragm such that the aperture diaphragm reaches the first diaphragm position at the beginning of an exposure period, and cause the aperture diaphragm to move from the first diaphragm position to the second diaphragm position during the exposure period.

BRIEF DESCRIPTION OF THE DRAWINGS

The accompanying drawings are included to provide a further understanding of the technology, and are incorporated in and constitute a part of this specification. The drawings illustrate embodiments and, together with the specification, serve to explain the principles of the technology.

DETAILED DESCRIPTION

Some embodiments of the present disclosure will be described detail below referring to the accompanying drawings. It is to be noted that description will be given in the following order.

1. First Embodiment (First example of exposure control)
1.1 Configuration
1.2 Operation
1.3 Effects
1.4 Modification Example of First Embodiment
2. Second Embodiment (Second example of exposure control)
2.1 Diaphragm control operation
2.2 Exposure Timing Control Operation
2.3 Effects
3. Third Embodiment (Example of light emission control)
3.1 Light Emission Control Operation
3.2 Effects
4. Other Embodiments 1. First Embodiment 1.1 Configuration of Image Pickup Unit (Entire Configuration of Image Pickup Unit)

Figure 1:
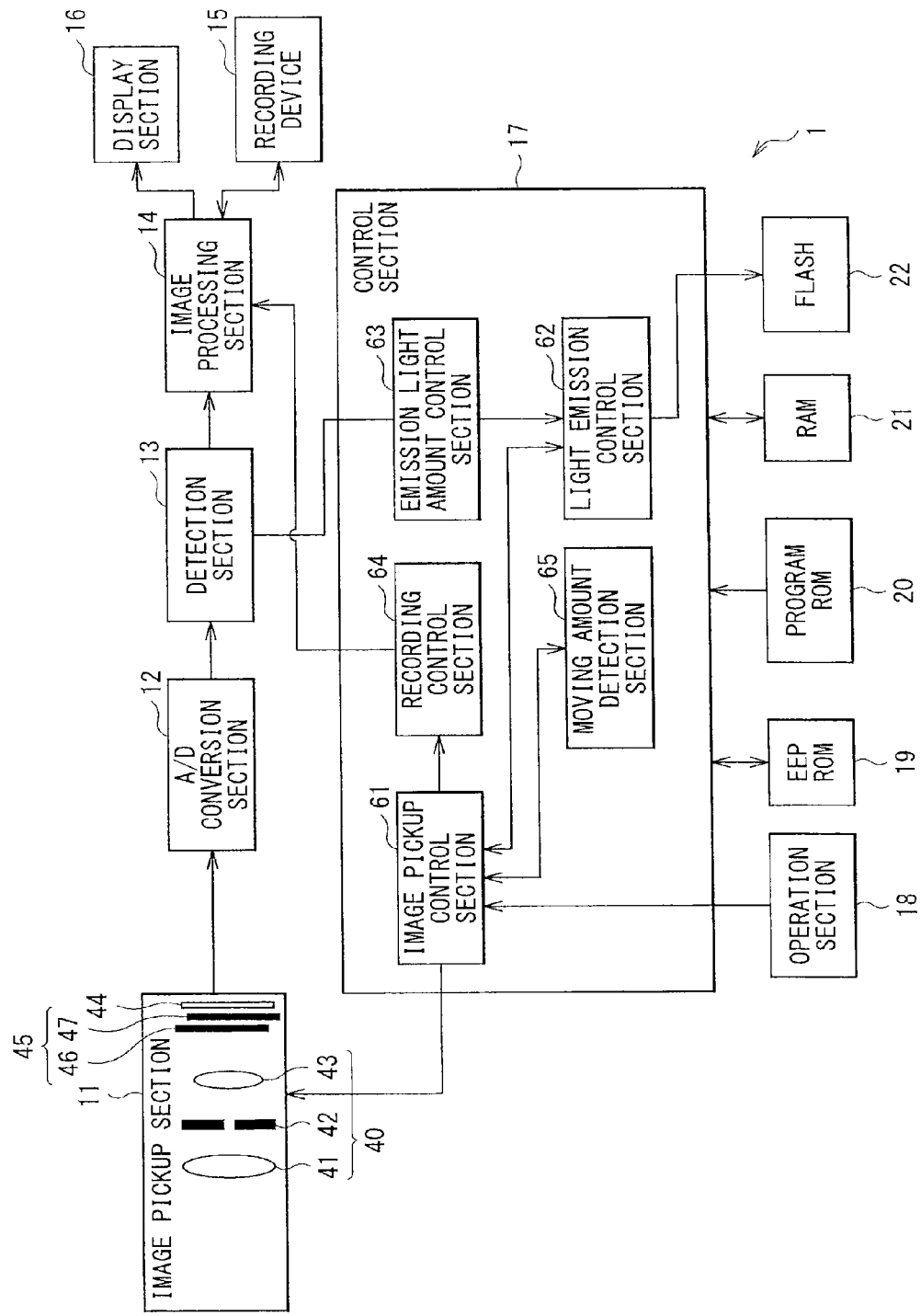
FIG. 1 is a block diagram illustrating an example of an entire configuration of an image pickup unit according to a first embodiment of the present disclosure.

FIG. 1 illustrates an example of an entire configuration of an image pickup unit 1 according to a first embodiment of the present disclosure.

The image pickup unit 1 includes an image pickup section 11, an A/D (analog-to-digital) conversion section 12, a detection section 13, an image processing section 14, a recording device 15, a display section 16, and a control section 17. The image pickup unit 1 further includes an operation section 18, an EEPROM (Electrically Erasable Programmable Read-Only Memory) 19, a program ROM (Read Only Memory) 20, a RAM (Random Access Memory) 21, and a flash 22.

The control section 17 includes an image pickup control section 61, a light emission control section 62, an emission light amount control section 63, a recording control section 64, and a moving amount detection section 65. The image pickup section 11 includes a lens section 40, an image pickup device 44, and a shutter 45.

The lens section 40 is an image pickup optical system that forms an optical image of a subject picked up by the image pickup device 44. The lens section 40 includes a plurality of lenses 41 and 43 and an aperture diaphragm 42. The image pickup unit 1 may be a lens-interchangeable camera. In the lens-interchangeable camera, the lens section 40 may be removable or interchangeable. One or more of the plurality of lenses 41 and 43 may be movable for focus adjustment or zooming.

The shutter 45 is disposed between the lens section 40 and the image pickup device 44. The shutter 45 may be, for example, a focal-plane mechanical shutter, and includes a front curtain 46 and a rear curtain 47.

The image pickup device 44 is configured to output an electrical signal corresponding to an optical image formed on an image pickup plane by the lens section 40, and is configured of a solid-state image pickup device such as a CMOS or a CCD (Charge Coupled Device). In the image pickup device 44, a plurality of pixels each including a photoelectric conversion device that converts light into an electrical signal and then outputs the electrical signal are two-dimensionally arranged.

The A/D conversion section 12 is configured to perform various kinds of signal processing on an output signal from the image pickup device 44 to generate a digital image signal. The detection section 13 is configured to detect a signal value of the image signal. The image processing section 14 is configured to perform various kinds of signal processing on the image signal to convert the image signal into suitable image data for recording to the recording device 15, and then output the image data. Moreover, the image processing section 14 is configured to perform various kinds of signal processing on the image signal to convert the image signal into suitable image data for displaying on the display section 16, and then output the image data.

The recording device 15 is configured to hold image data obtained by shooting. The display section 16 is configured to display an operation menu and the like of the image pickup unit 1 and to reproduce and display image data recorded in the recording device 15 in a reproduction mode. Moreover, the display section 16 is configured to display a live image during shooting in a live view mode.

The operation section 18 includes a release button, various operation switches and operation dials, and the like, and is configured to provide various operation signals to the image pickup control section 61 in the control section 17 according to an operation by a user.

The control section 17 is configured to perform overall control of respective components of the image pickup unit, and includes a CPU (Central Processing Unit). The control section 17 is configured to perform overall control of the respective component by executing a control program stored in the program ROM 20 in advance. The RAM 21 is configured to temporarily hold various kinds of data. The EEPROM 19 is a rewritable nonvolatile memory, and is configured to hold, for example, various kinds of setting information.

The image pickup control section 61 allows each component of the control section 17 to execute a control operation, based on an operation signal from the operation section 18, and allows the image pickup section 11 to execute drive control of each component. The light emission control section 62 and the emission light amount control section 63 are configured to perform light emission control of the flash 22. The recording control section 64 is configured to perform control for recording of image data to the recording device 15. The moving amount detection section 65 is configured to detect a moving amount of the lens section 40 that moves for focus adjustment or zooming.

(Configuration of Drive Control Section of Exposure System)

Figure 2:
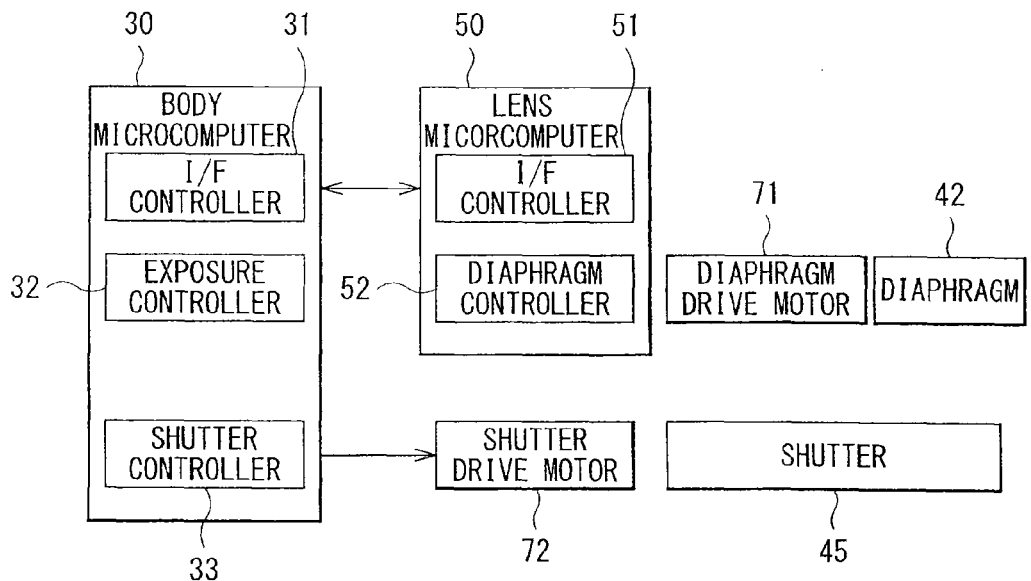
FIG. 2 is a block diagram illustrating a configuration example of a drive control section of an exposure system in the image pickup unit.

FIG. 2 illustrates a configuration example of a drive control section of an exposure system in the image pickup unit 1. FIG. 2 illustrates a configuration example in a case where the image pickup unit 1 is a lens-interchangeable camera. As illustrated in FIG. 2, the image pickup unit 1 may include a body microcomputer 30 in a camera body and the lens microcomputer 50 in the lens section 40. The body microcomputer 30 may include an I/F (interface) controller 31, and an exposure controller 32 and a shutter controller 33 as exposure control sections. The lens microcomputer 50 may include an I/F controller 51, and a diaphragm controller 52 as a diaphragm control section.

The diaphragm controller 52 is configured to variably control a diaphragm position of the aperture diaphragm 42 through a diaphragm drive motor 71. The shutter controller 33 is configured to control opening/closing of the shutter 45 through a shutter drive motor 72. As the diaphragm drive motor 71, for example, a stepping motor may be used.

Figure 3:
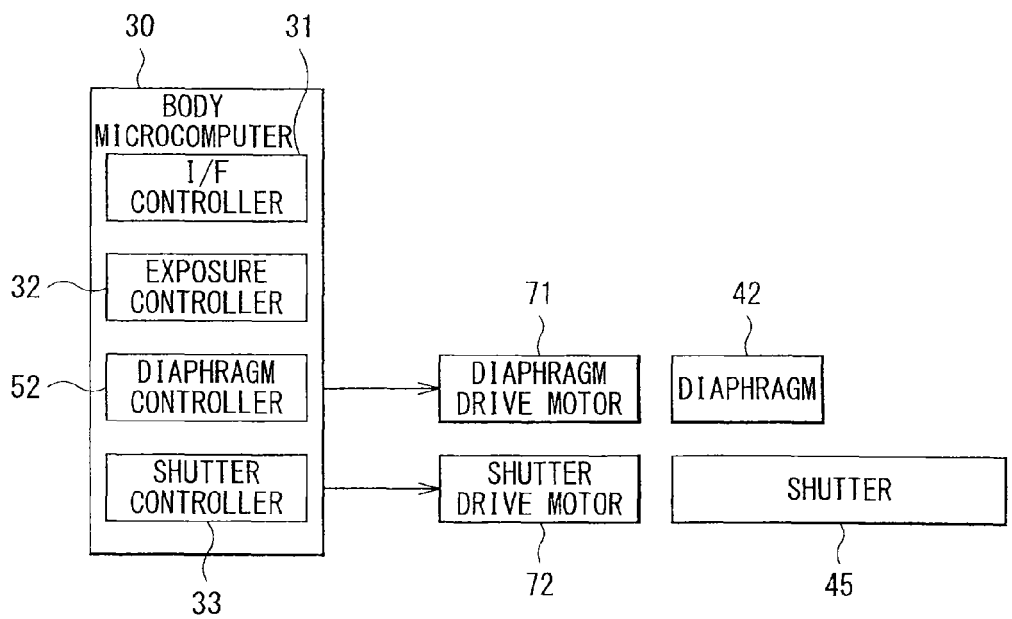
FIG. 3 is a block diagram illustrating another configuration example of the drive control section of the exposure system in the image pickup unit.

FIG. 3 illustrates another configuration example of the drive control section of the exposure system in the image pickup unit 1. FIG. 3 illustrates a configuration example in a case where the image pickup unit 1 is a camera with a built-in lens. In the case of the camera with a built-in lens, a configuration without the lens microcomputer 50 in FIG. 2 may be adopted. As illustrated in FIG. 3, the diaphragm controller 52 may be included in the body microcomputer 30.

1.2 Operation (Operation of Entire Image Pickup Unit)

In the image pickup unit 1 illustrated in FIG. 1, an image of light incident from a subject on the lens section 40 is formed on an image pickup plane of the image pickup device 44. An electrical signal into which the light is converted by the image pickup device 44 is input as an image signal to the image processing section 14 through the A/D conversion section 12 and the detection section 13. The image processing section 14 performs processing such as gray-scale or color-tone adjustment, noise reduction, and size conversion on the image signal, and then converts the image signal into compressed image data, and after that, the image processing section 14 stores the compressed image data as image data in the recording device 15. Moreover, image data output from the image processing section 14 is combined with an operation icon, shooting information, or the like by a display processing section (not illustrated), and then is displayed on the display section 16. Further, the image pickup control section 61 outputs a necessary instruction signal to the image pickup section 11, the light emission control section 62, and the recording control section 64, or the like as appropriate according to a user operation by the release button, the operation switch, or the like in the operation section 18.

(Operation of Exposure Control)

Next, an operation of exposure control will be described below referring to FIGS. 4 to 6.

Figure 4:
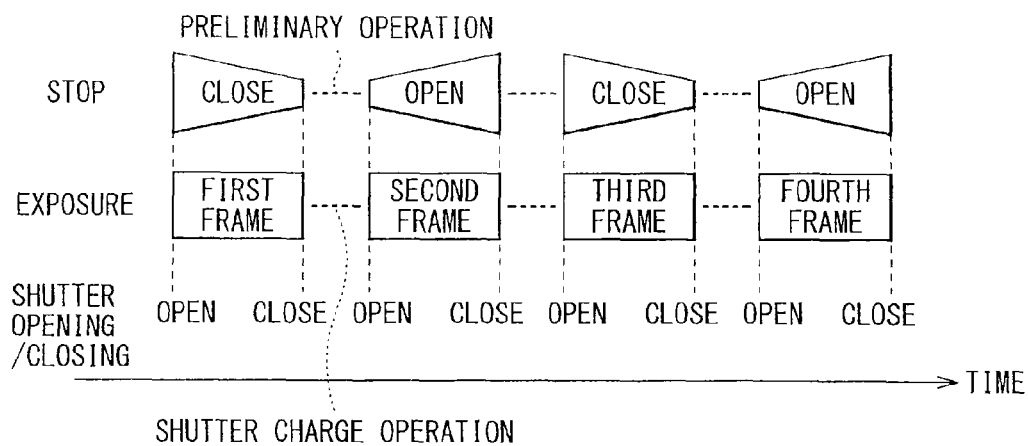
FIG. 4 is an explanatory diagram illustrating a first example of control of an aperture diaphragm in the image pickup unit according to the first embodiment.

FIG. 4 illustrates a first example of control of the aperture diaphragm 42 in this embodiment. FIG. 5 illustrates a second example of control of the aperture diaphragm 42. FIG. 6 illustrates an example of a flow of control of the aperture diaphragm 42.

Figure 5:
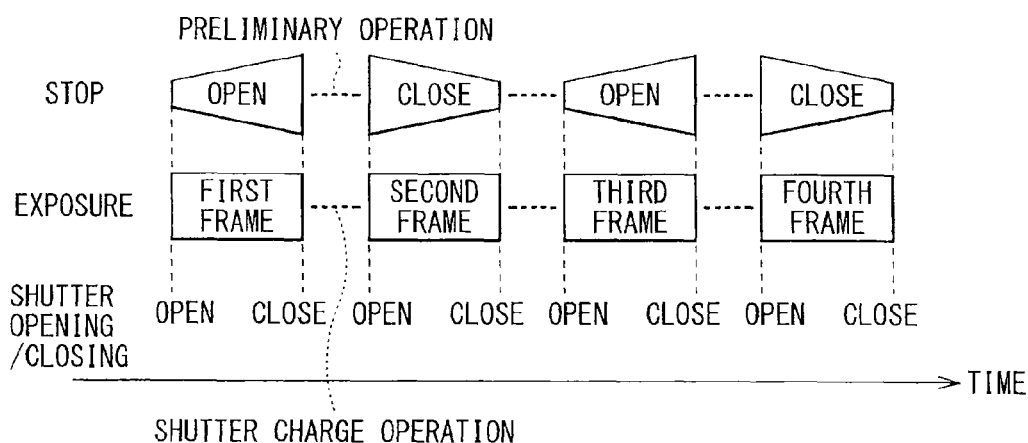
FIG. 5 is an explanatory diagram illustrating a second example of control of the aperture diaphragm in the image pickup unit according to the first embodiment.

FIGS. 4 and 5 illustrate the diaphragm position of the aperture diaphragm 42 and an opening/closing operation of the shutter 45 in respective frames when continuous shooting is performed. It is to be noted that the opening/closing operation of the shutter 45 is controlled by the exposure controller 32 and the shutter controller 33 illustrated in FIG. 2 or FIG. 3. The diaphragm position of the aperture diaphragm 42 is controlled by the diaphragm controller 52 illustrated in FIG. 2 or FIG. 3.

The diaphragm controller 52 variably controls the aperture diaphragm 42 between a first diaphragm position and a second diaphragm position different from the first diaphragm position during exposure. The diaphragm controller 52 performs control to alternately change a state of the diaphragm position of the aperture diaphragm 42 between a first change state and a second change state for each frame when continuous shooting is performed. In the first change state, the diaphragm controller 52 sets the diaphragm position at the start of exposure to the first diaphragm position, and changes the diaphragm position at the end of exposure to the second diaphragm position. In the second change state, the diaphragm controller 52 sets the diaphragm position at the start of exposure to the second diaphragm position, and changes the diaphragm position at the end of exposure to the first diaphragm position. Moreover, the diaphragm controller 52 allows the aperture diaphragm 42 to perform a preliminary operation for changing the diaphragm position with a shutter charge operation between frames.

In FIGS. 4 and 5, description will be given assuming that the first diaphragm position is a diaphragm position located closer to an open side than the second diaphragm position, the first change state is a state in which the diaphragm position is changed toward a closing direction, and the second change state is a state in which the diaphragm position is changed toward an opening direction.

More specifically, in the example in FIG. 4, in a first frame in continuous shooting, as the first change state, the diaphragm position of the aperture diaphragm 42 is changed toward the closing direction. Moreover, in a second frame, as the second change state, the diaphragm position of the aperture diaphragm 42 is changed toward the opening direction. Such operations are alternately repeated during continuous shooting.

In the example in FIG. 5, in the first frame in continuous shooting, as the second change state, the diaphragm position of the aperture diaphragm 42 is changed toward the opening direction. Moreover, in the second frame, as the first change state, the diaphragm position of the aperture diaphragm 42 is changed toward the closing direction. Such operations are alternately repeated during continuous shooting.

When such operations in FIG. 4 or FIG. 5 are performed, the diaphragm position at the end of exposure in one frame and the diaphragm position at the start of exposure in the next frame are the same as each other; therefore, the preliminary operation between frames during continuous shooting is allowed to be minimized, thereby contributing to an increase in speed of continuous shooting.

Whether the diaphragm position in a first frame when continuous shooting is performed is changed toward the closing direction as illustrated in FIG. 4 or toward the opening direction as illustrated in FIG. 5 is controlled as follows.

Before performing continuous shooting, the diaphragm controller 52 determines whether the diaphragm position of the aperture diaphragm 42 at present is located closer to the first diaphragm position or the second diaphragm position, and performs control of the state of the diaphragm position in a first frame in the continuous shooting, based on a determination result so as to set the state of the diaphragm position to the first change state or the second change state. In a case where the diaphragm position before performing the continuous shooting is located closer to the first diaphragm position, the diaphragm controller 52 performs control so as to set the state of the diaphragm position in the first frame to the first change state, and in a case where the diaphragm position before performing the continuous shooting is located closer to the second diaphragm position, the diaphragm controller 52 performs control so as to set the state of the diaphragm position in the first frame to the second change state. More specifically, control as illustrated in FIG. 6 is performed.

Figure 6:
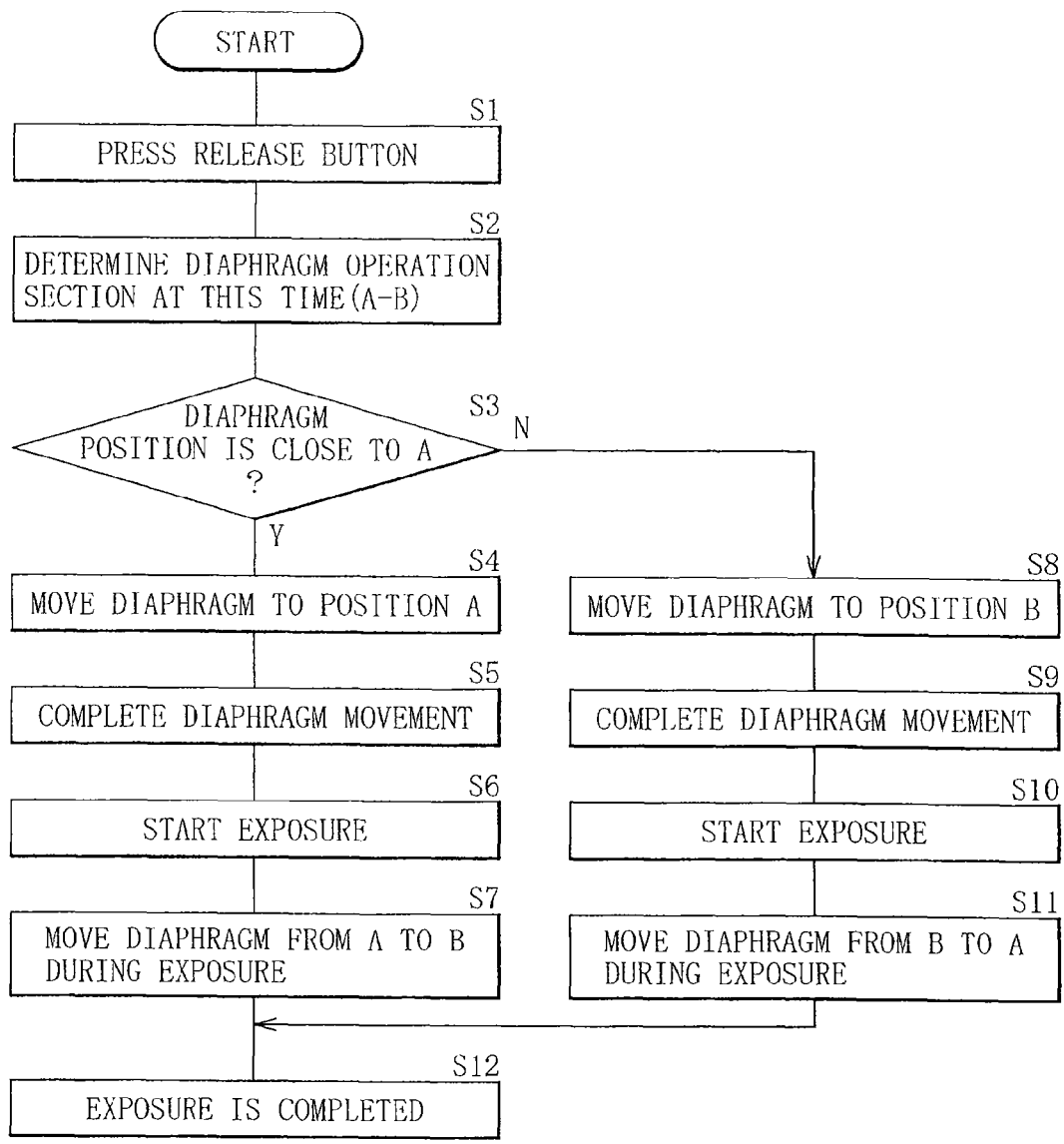
FIG. 6 is a flow chart illustrating an example of control of the aperture diaphragm in the image pickup unit according to the first embodiment.

FIG. 6 illustrates an example of a control operation of the aperture diaphragm 42 in the first frame. In the image pickup unit 1, when the release button of the operation section 18 is pressed (step S1), a diaphragm operation section at this time is determined, based on shooting conditions (step S2). In this case, the first diaphragm position is represented by A, and the second diaphragm position is represented by B. Next, the diaphragm controller 52 determines whether the diaphragm position of the aperture diaphragm 42 at present is located closer to the first diaphragm position A or the second diaphragm position B (step S3). In a case where the diaphragm position at present is located closer to the first diaphragm position A (step S3; Y), the diaphragm drive motor 71 is driven to move the aperture diaphragm 42 to the first diaphragm position A (step S4). After the movement of the aperture diaphragm 42 to the first diaphragm position A is completed (step S5), the shutter 45 is driven by the exposure controller 32 and the shutter controller 33 to start exposure (step S6). The diaphragm controller 52 drives the diaphragm drive motor 71 so as to change the diaphragm position from the first diaphragm position A to the second diaphragm position B during the exposure (step S7). The exposure controller 32 and the shutter controller 33 close the shutter 45 at an exposure end time to finish first exposure (step S12).

On the other hand, in a case where the diaphragm position at present is located closer to the second diaphragm position B (step S3; N), the diaphragm drive motor 71 is driven to move the aperture diaphragm 42 to the second diaphragm position B (step S8). After the movement of the aperture diaphragm 42 to the second diaphragm position B is completed (step S9), the shutter 45 is driven by the exposure controller 32 and the shutter controller 33 to start exposure (step S10). The diaphragm controller 52 drives the diaphragm drive motor 71 so as to change the diaphragm position from the second diaphragm position B to the first diaphragm position A during the exposure (step S11). The exposure controller 32 and the shutter controller 33 close the shutter 45 at the exposure end time to finish the first exposure (step S12).

Thus, control is performed based on the diaphragm position before the start of release in the first frame to dynamically change the diaphragm start position in the first frame and a driving direction so as to minimize a preliminary diaphragm driving amount. Accordingly, a release time lag is allowed to be reduced.

1.3 Effects

As described above, in this embodiment, when continuous shooting is performed, control is performed to alternately change the state of the diaphragm position of the aperture diaphragm 42 between the first change state and the second change state for each frame; therefore, the preliminary operation of the aperture diaphragm 42 when an apodization effect is obtained is allowed to be performed at higher speed. Therefore, the speed of continuous shooting is allowed to be enhanced. Moreover, a diaphragm driving start position is allowed to be set to a position closer to the diaphragm position immediately before shooting in a section where the aperture diaphragm 42 is supposed to move to obtain the apodization effect during shooting; therefore, the release time lag is allowed to be minimized.

It is to be noted that the effects described in this description are merely examples; therefore, effects in this embodiment is not limited thereto, and this embodiment may have other effects. This is also applicable to other embodiments and modification examples that will be described later.

1.4 Modification Examples of First Embodiment

Figure 7:
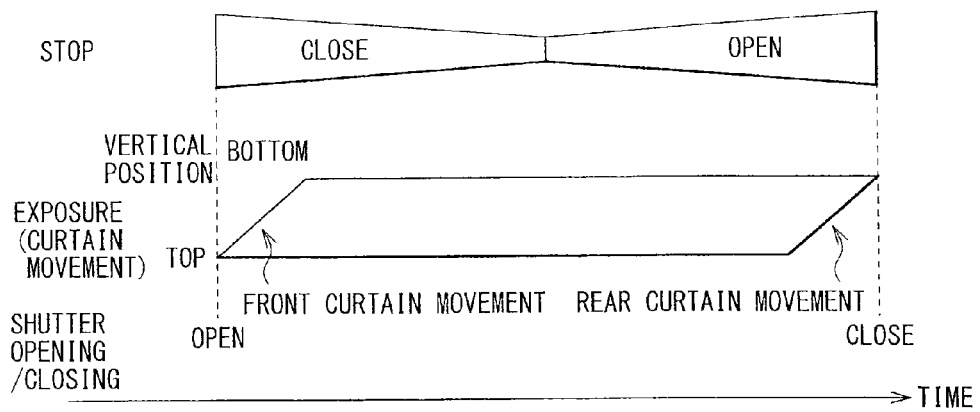
FIG. 7 is an explanatory diagram illustrating a first example of control of an aperture diaphragm in an image pickup unit according to a modification example of the first embodiment.
Figure 8:
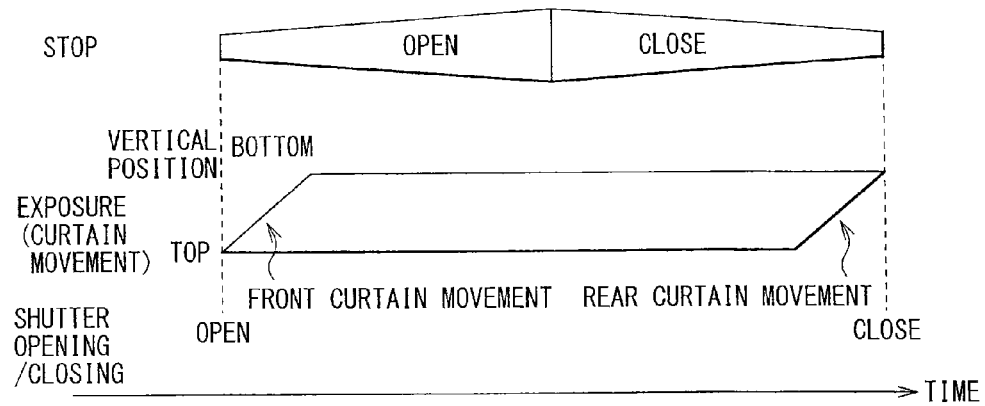
FIG. 8 is an explanatory diagram illustrating a second example of control of the aperture diaphragm in the image pickup unit according to the modification example of the first embodiment.
Figure 9:
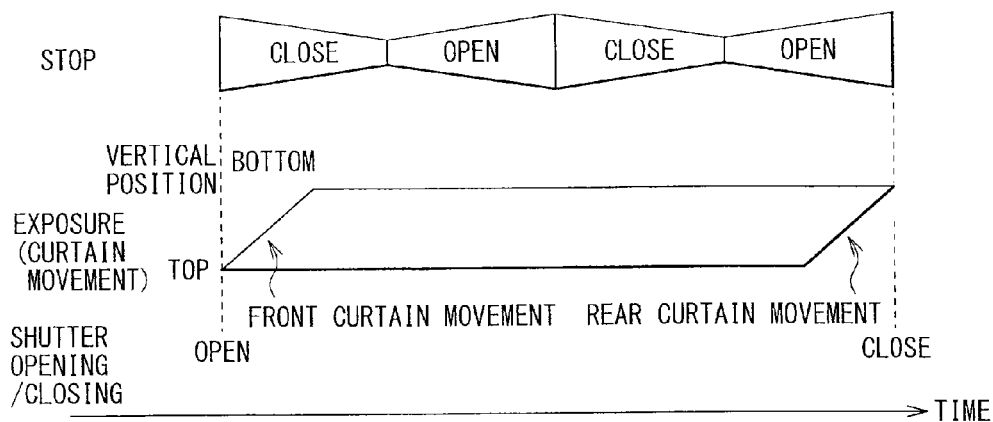
FIG. 9 is an explanatory diagram illustrating a third example of control of the aperture diaphragm in the image pickup unit according to the modification example of the first embodiment.
Figure 10:
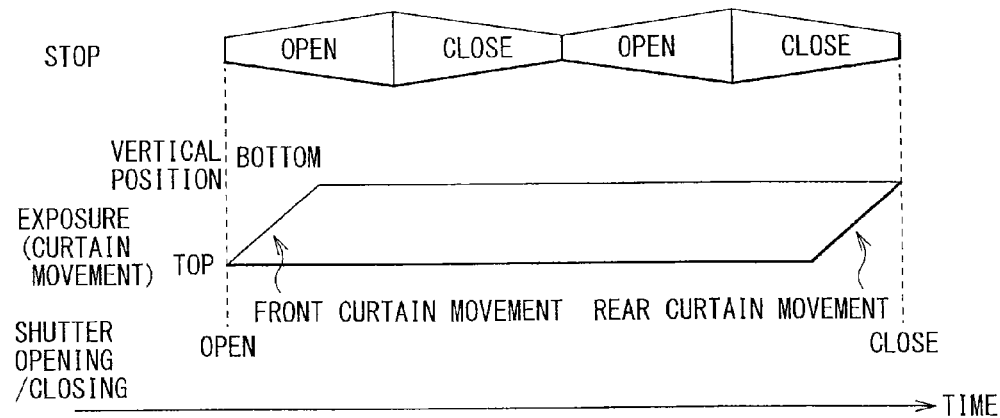
FIG. 10 is an explanatory diagram illustrating a fourth example of control of the aperture diaphragm in the image pickup unit according to the modification example of the first embodiment.
Figure 11:
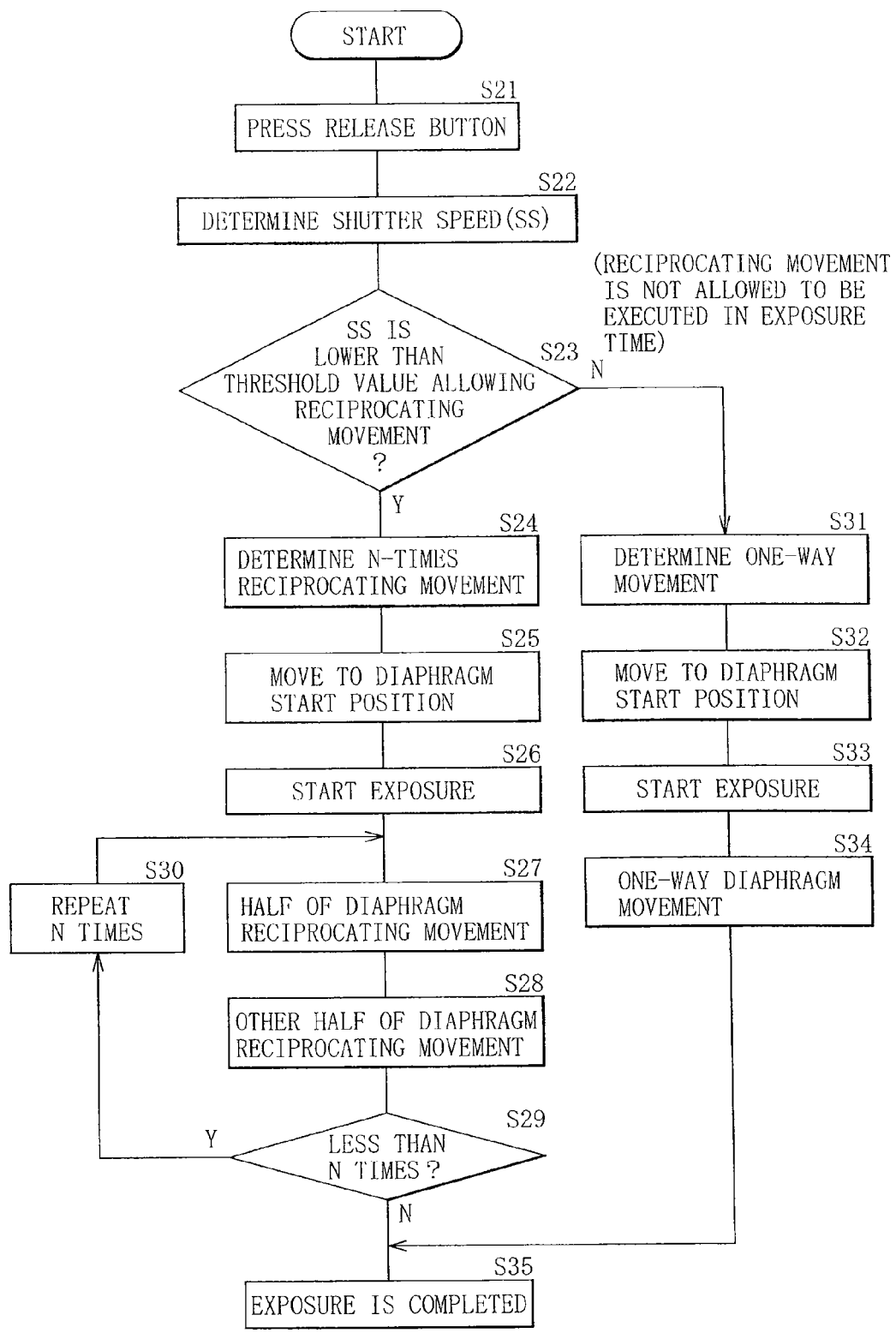
FIG. 11 is a flow chart illustrating an example of control of the aperture diaphragm in the image pickup unit according to the modification example of the first embodiment.

Next, exposure control according to a modification example of the first embodiment will be described below referring to FIGS. 7 to 11. FIG. 7 illustrates a first example of control of the aperture diaphragm according to the modification example. FIG. 8 illustrates a second example of control of the aperture diaphragm according to the modification example. FIG. 9 illustrates a third example of control of the aperture diaphragm 42 according to the modification example. FIG. 10 illustrates a fourth example of control of the aperture diaphragm 42 according to the modification example. FIG. 11 illustrates an example of a flow of control of the aperture diaphragm 42 according to the modification example.

FIGS. 7 to 10 illustrate the diaphragm position of the aperture diaphragm 42 and the opening/closing operation of the shutter 45 in one exposure section during shooting. The shutter 45 is a focal-plane mechanical shutter, and in a middle portion in each of FIGS. 7 to 10, a curtain moving state including a moving state of the front curtain 46 and a moving state of the rear curtain 47 is illustrated.

In a case where the focal-plane mechanical shutter is used for exposure, it takes several milliseconds to move the mechanical shutter; therefore, as illustrated in the middle portion in each of FIGS. 7 to 10, an exposure timing differs between a top portion and a bottom portion of an image pickup plane. Therefore, when the diaphragm position of the aperture diaphragm 42 is changed simply in one direction during exposure, exposure unevenness in brightness between a top and a bottom of a shot image may occur. In this modification example, to reduce such exposure unevenness, control to move the aperture diaphragm 42 back and forth between the diaphragm positions N times (where N is an integer of 1 or over) in one shot (one exposure section) is performed. Thus, exposure unevenness caused by a difference in the diaphragm position between the top portion and the bottom portion of the image pickup plane is preventable.

In this modification example, the diaphragm controller 52 performs control to alternately change the state of the diaphragm position of the aperture diaphragm 42 between the first change state and the second change state N times in one exposure section. N is 1 or over, and control to alternately change the state of the diaphragm position of the aperture diaphragm 42 between the first change state and the second change state is performed one or more times in one exposure section. In the first change state, the diaphragm controller 52 sets the diaphragm position to the first diaphragm position at first, and changes the diaphragm position to the second diaphragm position in the end. In the second change state, the diaphragm controller 52 sets the diaphragm position to the second diaphragm position at first, and changes the diaphragm position to the first diaphragm position in the end.

In FIGS. 7 and 9, description will be given assuming that the first diaphragm position is a diaphragm position located closer to the open side than the second diaphragm position, the first change state is a state in which the diaphragm position is changed toward the closing direction, and the second change state is a state in which the diaphragm position is changed toward the opening direction. On the other hand, in FIGS. 8 and 10, description will be given assuming that the first diaphragm position is a diaphragm position in the closing direction, compared to the second diaphragm position, the first change state is a state in which the diaphragm position is changed toward the opening direction, and the second change state is a state in which the diaphragm position is changed toward the closing direction.

As a specific example, in the example in FIG. 7, in a first half of one exposure section, as the first change state, the diaphragm position of the aperture diaphragm 42 is changed toward the closing direction. Moreover, in a second half of the one exposure section, as the second change state, the diaphragm position of the aperture diaphragm 42 is changed toward the opening direction. In FIG. 9, an example in which such control is repeated twice in the one exposure section is illustrated.

In the example in FIG. 8, in a first half of one exposure section, as the first change state, the diaphragm position of the aperture diaphragm 42 is changed toward the opening direction. Moreover, in a second half of the one exposure section, as the second change state, the diaphragm position of the aperture diaphragm 42 is changed toward the closing direction. In FIG. 10, an example in which such control is repeated twice in the one exposure section is illustrated.

The diaphragm controller 52 may dynamically determine, based on shutter speed, whether or not diaphragm control to move the diaphragm position back and forth between the diaphragm positions as illustrated in FIGS. 7 to 10 is performed. In a case where the diaphragm control as illustrated in FIGS. 7 to 10 is performed, a moving distance of the diaphragm is twice as large as normal. Therefore, in a case where the shutter speed is high (one exposure section is short), reciprocating movement of the diaphragm position as illustrated in FIGS. 7 to 10 may not be executed. In such a case, one-way movement in which the diaphragm position is changed only in one direction (in the opening direction or the closing direction) is performed. An example in which such a determination is performed will be described below referring to FIG. 11.

When the release button of the operation section 18 is pressed (step S21), the image pickup unit 1 determines shutter speed (SS), based on shooting conditions (step S22). The diaphragm controller 52 determines whether or not the shutter speed (SS) is lower than a predetermined threshold value at which the diaphragm position is allowed to move back and forth (step S23). In a case where the shutter speed (SS) is not lower than the predetermined threshold value (step S23; N), the reciprocating movement of the diaphragm position is not allowed to be executed in one exposure section; therefore, it is determined to perform the one-way movement (step S31). The diaphragm controller 52 drives the diaphragm drive motor 71 to move the diaphragm position of the aperture diaphragm 42 to a predetermined start position (step S32). After that, the shutter 45 is driven by the exposure controller 32 and the shutter controller 33 to start exposure (step S33). The diaphragm controller 52 allows the diaphragm drive motor 71 to perform the one-way movement in which the diaphragm position is changed only in one direction (step S34). When the exposure end time comes, the exposure controller 32 and the shutter controller 33 close the shutter 45 to finish the exposure (step S45).

On the other hand, in a case where the shutter speed (SS) is lower than the predetermined threshold value (step S23; Y), the reciprocating movement of the diaphragm position is allowed to be executed in one exposure period; therefore, it is determined to perform the reciprocating movement (step S24). The diaphragm controller 52 drives the diaphragm drive motor 71 to move the diaphragm position of the aperture diaphragm 42 to the predetermined start position (step S25). After that, the shutter 45 is driven by the exposure controller 32 and the shutter controller 33 to start exposure (step S26). The diaphragm controller 52 allows the diaphragm drive motor 71 to perform the reciprocating movement of the diaphragm position during the exposure so as to set the state of the diaphragm position to the first change state in a half of the reciprocating movement and the second change state in the other half of the reciprocating movement (steps S27 and S28). The diaphragm controller 52 repeats such reciprocating movement N times (step S29; Y, step S30). When the reciprocating movement is performed N times (step S29; N), and the exposure end time comes, the exposure controller 32 and the shutter controller 33 closes the shutter 45 to finish the exposure (step S35).

In this modification example, control to alternately change the state of the diaphragm position of the aperture diaphragm 42 between the first change state and the second change sate is performed one or more times in one exposure section; therefore, the preliminary operation of the aperture diaphragm 42 when an apodization effect is obtained is allowed to be performed at higher speed. Moreover, exposure unevenness when exposure by the focal-plane shutter is performed is allowed to be reduced.

2. Second Embodiment 2.1 Diaphragm Control Operation

A diaphragm control operation according to a second embodiment will be described below referring to FIGS. 12 to 15. It is to be noted that basic configurations of an entire image pickup unit and a drive control section of an exposure system according to this embodiment may be substantially similar to those in the above-described first embodiment (refer to FIGS. 1 to 3).

Figure 12:
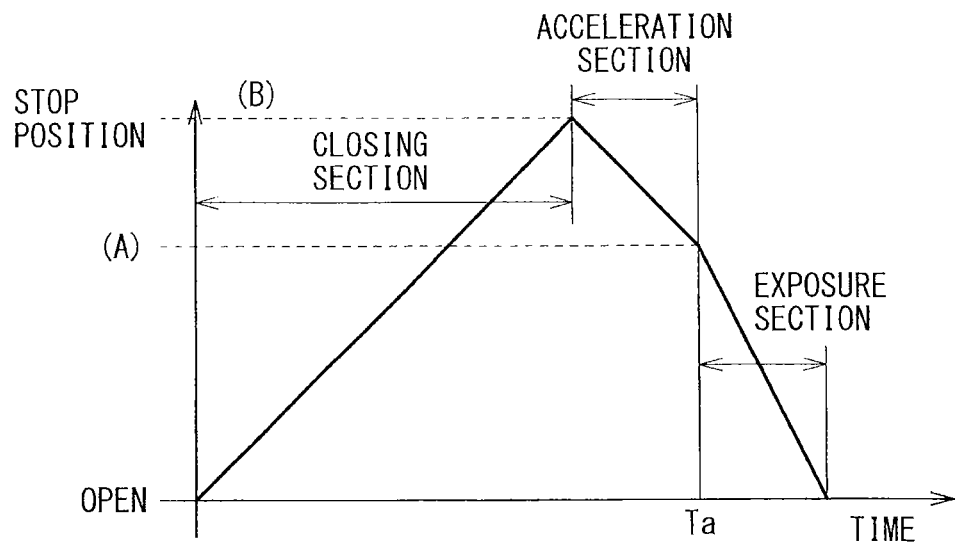
FIG. 12 is an explanatory diagram illustrating a first example of control of an aperture diaphragm in an image pickup unit according to a second embodiment.
Figure 13:
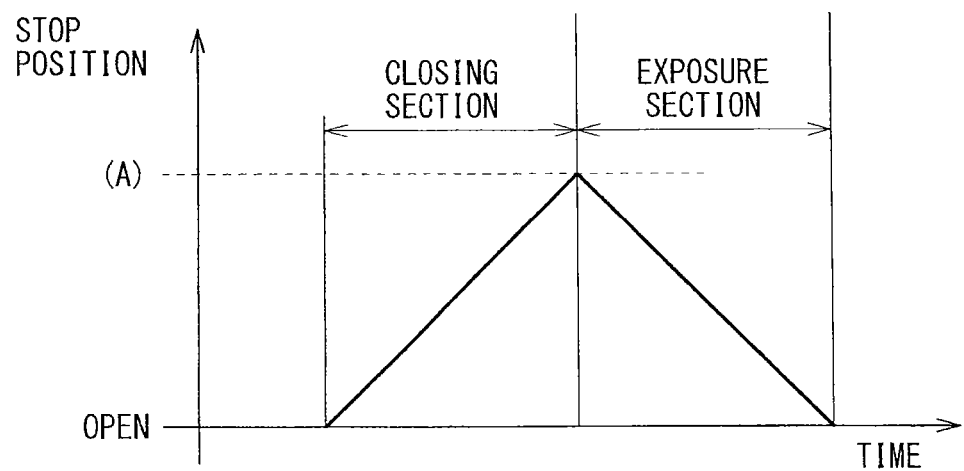
FIG. 13 is an explanatory diagram illustrating a first example of control of an aperture diaphragm in an image pickup unit according to a comparative example.
Figure 14:
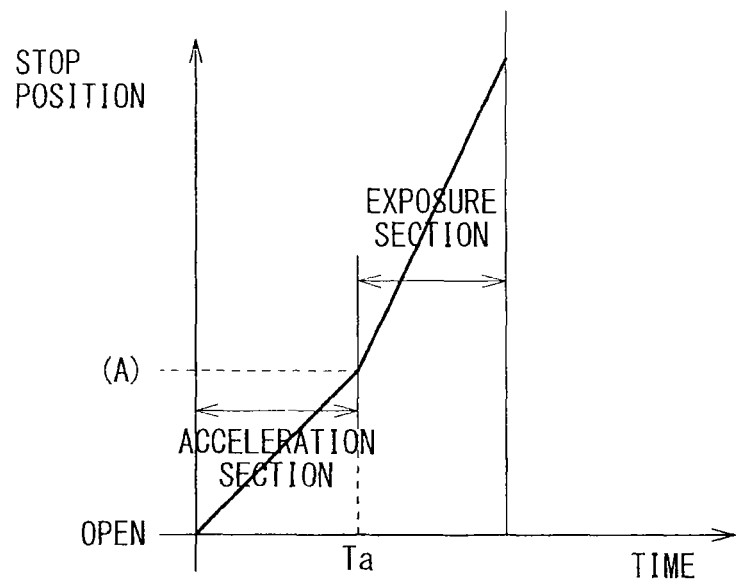
FIG. 14 is an explanatory diagram illustrating a second example of control of the aperture diaphragm in the image pickup unit according to the second embodiment.
Figure 15:
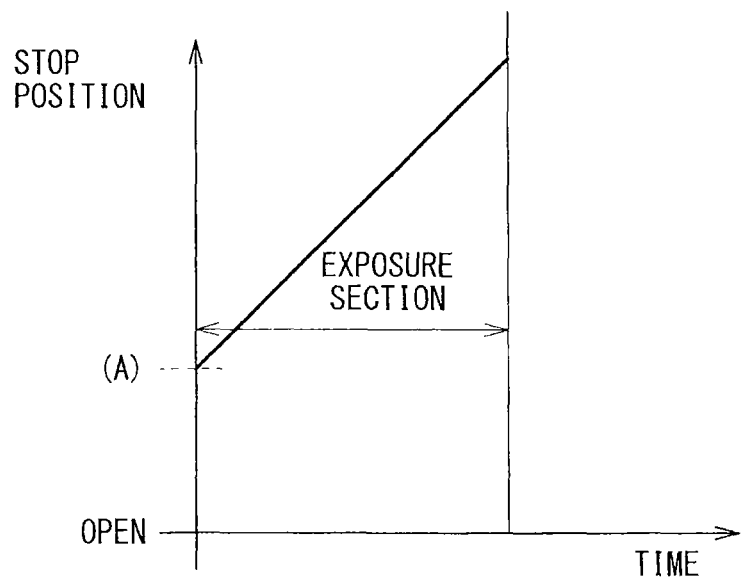
FIG. 15 is an explanatory diagram illustrating a second example of control of the aperture diaphragm in the image pickup unit according to the comparative example.

FIG. 12 illustrates a first example of control of the aperture diaphragm 42 according to this embodiment. FIG. 13 illustrates an example of control of the aperture diaphragm 42 as a comparative example with respect to FIG. 12. FIG. 14 illustrates a second example of control of the aperture diaphragm 42 according to this embodiment. FIG. 15 illustrates an example of control of the aperture diaphragm 42 as a comparative example with respect to FIG. 14.

In this embodiment, the diaphragm controller 52 drives the diaphragm drive motor 71 to perform diaphragm control to move the diaphragm position of the aperture diaphragm 42 from a first diaphragm position to a second diaphragm position in an exposure section based on an exposure start timing Ta. At this time, before the exposure start timing Ta, the diaphragm controller 52 performs control to acceleratingly move the diaphragm position of the aperture diaphragm 42 in a same direction as a direction where the diaphragm position moves in the exposure section to bring the diaphragm position of the aperture diaphragm 42 closer to the first diaphragm position.

FIG. 12 illustrates an example in a case where the second diaphragm position in the above description is a diaphragm position located closer to the open side than the first diaphragm position (A). In other words, the direction where the diaphragm position moves in the exposure section is a direction where a diaphragm is opened. In this case, before the exposure start timing Ta, the diaphragm controller 52 temporarily moves the diaphragm position of the aperture diaphragm 42 to a third diaphragm position, or acceleration starting position, (B) at which the diaphragm is closed more than at the first diaphragm position (A) (in a closing section in FIG. 12). After that, the diaphragm position of the aperture diaphragm 42 is acceleratingly moved from the third diaphragm position (B) to be brought closer to the first diaphragm position (A) (in an acceleration section in FIG. 12). After that, the diaphragm position of the aperture diaphragm 42 is moved from the first diaphragm position (A) to the desired second diaphragm position in the exposure section.

In the comparative example with respect to the example of control in FIG. 12, the acceleration section is not included. In the comparative example in FIG. 13, the exposure section starts immediately after the diaphragm position of the aperture diaphragm 42 is moved from the open side to the first diaphragm position (A). In such control, the exposure section starts immediately after the aperture diaphragm 42 is moved to the first diaphragm position (A) from a direction opposite to the direction where the diaphragm position moves in the exposure section; therefore, for example, in a diaphragm driving system using a stepping motor, it is difficult for the aperture diaphragm to operate at high speed in the exposure section due to an influence of an inertial force or a frictional force of the motor, or the like. On the other hand, in the example of control in FIG. 12, the acceleration section is provided, and the diaphragm position of the aperture diaphragm 42 is acceleratingly moved in the same direction as the direction where the diaphragm position moves in the exposure section; therefore, the speed of the operation of the aperture diaphragm 42 in the following exposure section is allowed to be increased.

FIG. 14 illustrates an example in a case where the second diaphragm position in the above description is a diaphragm position at which the aperture diaphragm is closed more than at the first diaphragm position (A). In other words, the direction where the diaphragm position moves in the exposure section is a direction where the aperture diaphragm is closed from the open side. In this case, before the exposure start timing Ta, the diaphragm controller 52 acceleratingly moves the diaphragm position of the aperture diaphragm 42 from a diaphragm position located closer to the open side than the first diaphragm position (A) to bring the diaphragm position of the aperture diaphragm 42 closer to the first diaphragm position (A) (in the acceleration section in FIG. 14). After that, the diaphragm position of the aperture diaphragm 42 is moved from the first diaphragm position (A) to the desired second diaphragm position in the exposure section.

In the comparative example in FIG. 15 with respect to the example of control in FIG. 14, the acceleration section is not included. In the comparative example in FIG. 15, the exposure section immediately starts without passing the acceleration section. Therefore, it is difficult for the aperture diaphragm 42 to operate at high speed in the exposure section. On the other hand, in the example of control in FIG. 14, the acceleration section is provided, and the diaphragm position of the aperture diaphragm 42 is acceleratingly moved in the same direction as the direction where the diaphragm position moves in the exposure section; therefore, the speed of the operation of the aperture diaphragm 42 in the following exposure section is allowed to be increased.

2.2 Exposure Timing Control Operation

Figure 16:
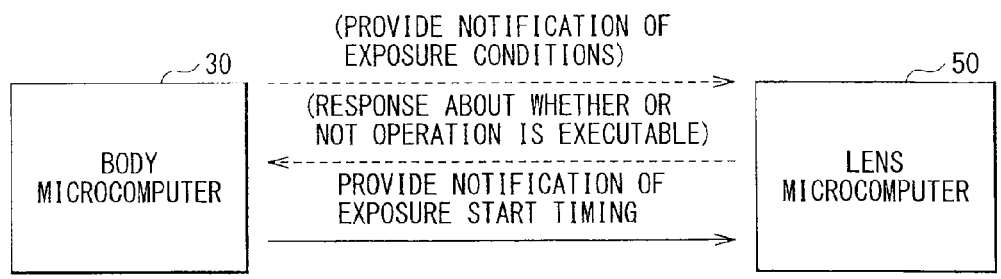
FIG. 16 is a block diagram illustrating an example of communication between a body microcomputer and a lens microcomputer in the image pickup unit according to the second embodiment.
Figure 17:
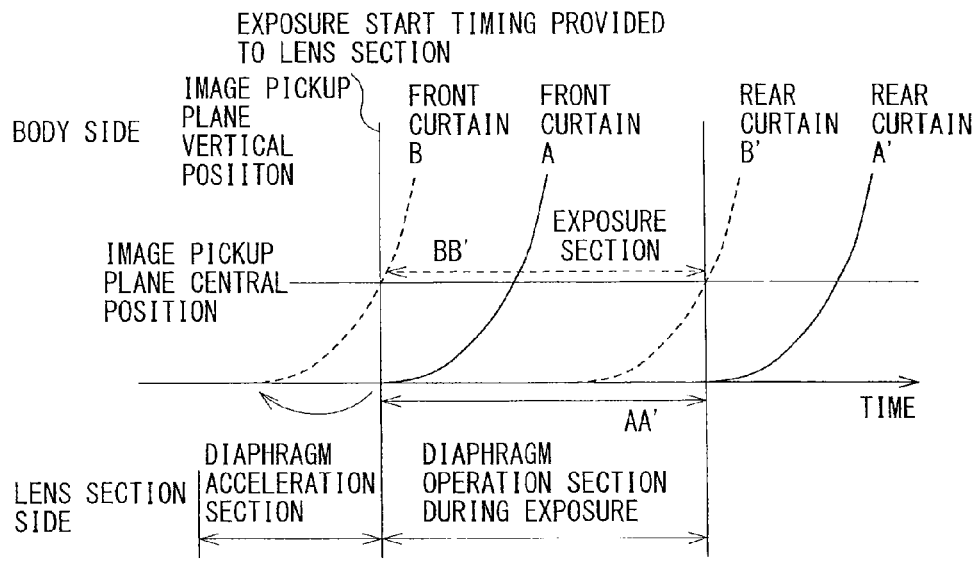
FIG. 17 is an explanatory diagram illustrating an example of control of an exposure timing in the image pickup unit according to the second embodiment.

Next, an exposure timing control operation according to this embodiment will be described below referring to FIGS. 16 and 17. FIG. 16 illustrates an example of communication between the body microcomputer 30 and the lens microcomputer 50 according to this embodiment. FIG. 17 illustrates an example of control of an exposure timing according to this embodiment.

In a case of a lens-interchangeable camera, for example, as illustrated in FIG. 2, the diaphragm controller 52 as a diaphragm control section is disposed in the lens microcomputer 50. Moreover, the exposure controller 32 and the shutter controller 33 as exposure control sections are disposed in the body microcomputer 30.

In this embodiment, the exposure control section notifies the diaphragm controller 52 in the lens microcomputer 50 of the exposure start timing Ta with use of a predetermined synchronization signal as a reference. Moreover, the exposure control section variably controls a driving start time of the shutter, based on the exposure start timing Ta. The diaphragm controller 52 in the lens microcomputer 50 acceleratingly moves the diaphragm position of the aperture diaphragm 42 to reach the first diaphragm position (A) at the exposure start timing Ta notified by the exposure control section, as with the above-described example illustrated in FIGS. 12 and 14.

The example of communication between the body microcomputer 30 and the lens microcomputer 50 established when the above control operation is performed will be described below in more detail.

Before the start of a shooting operation, start and end values of an aperture value changed during exposure are determined from a blur amount and the amount of apodization effect. These values may be specified by a user through the operation section 18. After half pressing of a shutter release button of the operation section 18 is detected, an exposure calculation is performed considering that the aperture value is changed during exposure to determine the shutter speed and an ISO value. Alternatively, one or both of the shutter speed and the ISO value may be specified by a user. After that, an AF (autofocus) operation is performed. The AF operation is executed with a value closest to the open side of aperture values applicable during exposure so as not to cause defocusing at a focusing plane during the exposure.

In the case of the lens-interchangeable camera with the configuration illustrated in FIG. 2, after full-pressing of the shutter release button is detected, the body microcomputer 30 notifies the lens microcomputer 50 of exposure conditions as illustrated in FIG. 16. Examples of the notified exposure conditions include exposure time, the aperture value at the start of exposure, and the aperture value at the end of exposure.

As illustrated in FIG. 16, the lens microcomputer 50 gives a response about whether or not a requested operation is executable, and an F-number and time necessary for acceleration to the body microcomputer 30. Alternatively, before the shutter release button is pressed, the lens microcomputer 50 notifies the body microcomputer 30 of an operable range in advance, and a response about whether or not the requested operation is executable may be eliminated.

As illustrated in FIG. 16, the body microcomputer 30 notifies the lens microcomputer 50 of the exposure start timing Ta. In a case where the lens microcomputer 50 is configured to perform an operation in synchronization with a predetermined synchronization signal, a notification method in which exposure starts by an nth synchronization signal from a synchronization signal immediately after notification is adopted. In a case of a lens with a configuration in which an operation is performed without synchronizing the synchronization signal, a notification method in which exposure starts in several seconds from the synchronization signal immediately after the notification may be adopted.

The body microcomputer 30 adjusts a start timing of movement of the front curtain 4 in the shutter 45 to a synchronization signal specified as the exposure start timing Ta (in this case, a release time lag is not shortest). The movement of the front curtain and the movement of the rear curtain are represented by A and A' in FIG. 17, respectively.

When the start timing of front curtain movement is shifted forward from the specified synchronization signal by time from when the front curtain 46 starts moving to when the front curtain 46 reaches a center of the image pickup plane, time when the exposure on a central portion of the image pickup plane starts is allowed to be adjusted to the aperture value at the start of exposure specified in the lens microcomputer 50. Moreover, time when the exposure on the central portion of the image pickup plane ends is allowed to be adjusted to the aperture value at the end of exposure specified in the lens microcomputer 50. The movement of the front curtain and the movement of the rear curtain in this case are represented by B and B' in FIG. 17, respectively. Assuming that this is considered as a reference exposure position, the reference exposure position is allowed to be adjusted to an arbitrary position in a vertical direction of the image pickup plane by shifting the start timing of front curtain movement.

The lens microcomputer 50 starts an acceleration operation earlier by time necessary for acceleration, based on the timing of the specified synchronization signal, and finishes the necessary acceleration operation at the timing of the specified synchronization signal. At the end of the acceleration operation, the specified aperture value at the start of exposure is achieved. It takes specified exposure time from a timing of an exposure start synchronization signal to control the diaphragm to the specified aperture value at the end of exposure.

It is to be noted that, in a case of a camera with the configuration as illustrated in FIG. 3, communication with the lens microcomputer 50 is not necessary, and after the aperture diaphragm is closed by a necessary aperture value for the acceleration operation, the acceleration operation starts, and the necessary acceleration operation is finished. At the end of the acceleration operation, the specified aperture value at the start of exposure is achieved. It takes specified exposure time from the timing of the exposure start synchronization signal to control the diaphragm to a specified F-number at the end of exposure.

2.3 Effects

As described above, in this embodiment, before the exposure start timing Ta, the diaphragm position of the aperture diaphragm 42 is acceleratingly moved to be brought closer to an initial diaphragm position in the exposure section; therefore, the apodization effect is allowed to be obtained even if the shutter speed is increased. Compared to a case where the acceleration section is not provided, shutter speed necessary to obtain an equal apodization effect is allowed to be increased.

3. Third Embodiment

Example of Light Emission Control 3.1 Light Emission Control Operation

A third embodiment relates to light emission control of the flash 22. A light emission control operation of the flash 22 according to this embodiment will be described below referring to FIGS. 18 and 19. It is to be noted that basic configurations of an entire image pickup unit and a drive control section of an exposure system according to this embodiment may be substantially similar to those in the above-described first embodiment (refer to FIGS. 1 to 3).

Figure 18:
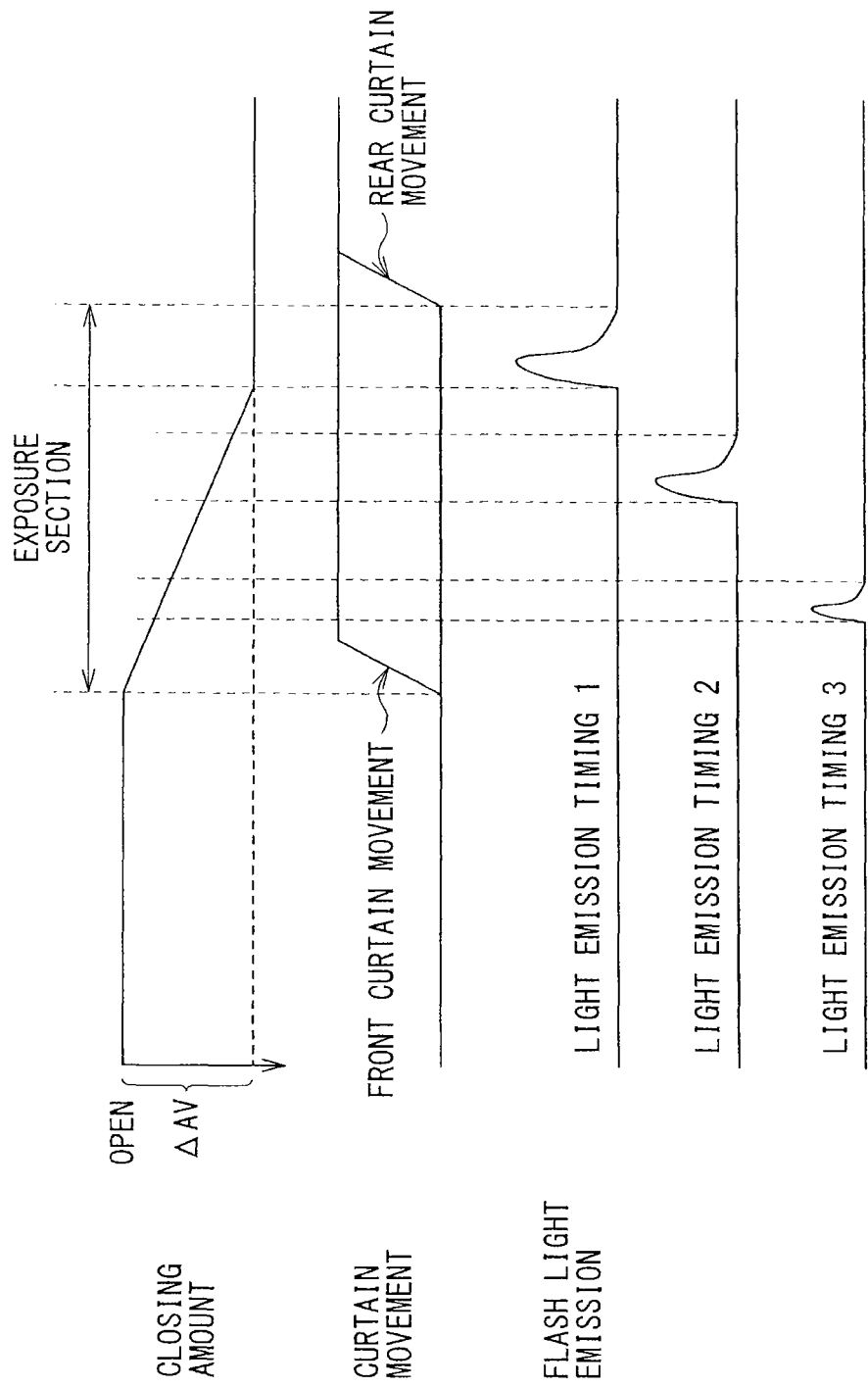
FIG. 18 is a timing chart illustrating an example of a light emission timing of a flash in an image pickup unit according to a third embodiment.
Figure 19:
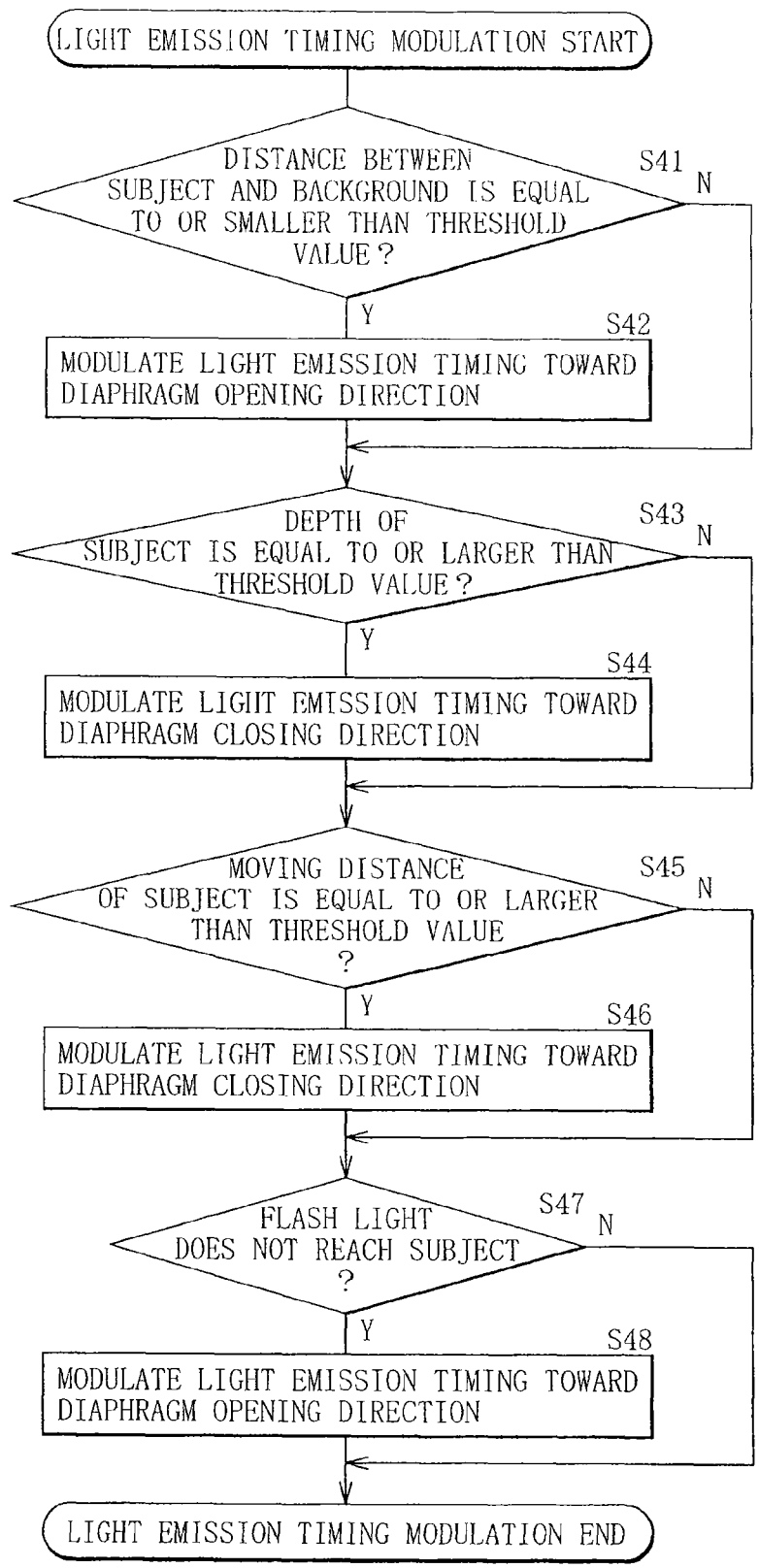
FIG. 19 is a flow chart illustrating an example of control of the light emission timing of the flash in the image pickup unit according to the third embodiment.

FIG. 18 illustrates an example of a light emission timing of the flash 22 according to this embodiment. FIG. 19 illustrates an example of a flow of control of the light emission timing of the flash 22 according to this embodiment. In a top portion in FIG. 18, change in the diaphragm position of the aperture diaphragm 42 is illustrated. In the example in FIG. 18, in the exposure section, the diaphragm position of the aperture diaphragm 42 is changed to close the aperture diaphragm by a closing amount $\Delta AV$ from an open state. In a middle portion in FIG. 18, a curtain moving state including the moving state of the front curtain 46 and the moving state of the rear curtain 47 in a case where the shutter 45 is a focal-plane mechanical shutter is illustrated. In a bottom portion in FIG. 18, an example of the light emission timing and a light emission amount of the flash 22 is illustrated.

As illustrated in FIG. 1, the light emission timing of the flash 22 is controlled by the light emission control section 62. The diaphragm controller 52 variably controls the aperture diaphragm 42 between the first diaphragm position and the second diaphragm position at which the aperture diaphragm is closed more than at the first diaphragm position during exposure. For example, the light emission control section 62 allows the flash 22 to emit light at a first timing at which the aperture diaphragm 42 is closed to the second diaphragm position (at a light emission timing 1 in FIG. 18). When the flash 22 emits light with the diaphragm opened, a depth of field of a subject exposed to flash light becomes shallower, and it is difficult for the subject to stand out. When the flash 22 emits light at a timing at which the aperture diaphragm is closed as with the light emission timing 1 in FIG. 18, the depth of field of the subject exposed to flash light becomes deeper, and an image in which the subject stands out more conspicuously is allowed to be taken.

The light emission control section 62 may modulate the light emission timing of the flash 22, based on shooting conditions. The light emission control section 62 determines whether or not shooting conditions for the subject satisfy a first condition, and in a case where the first condition is satisfied, the flash 22 may emit light at a second timing (a light emission timing 2 in FIG. 18) at which the aperture diaphragm 42 is opened wider than at the second diaphragm position. In this case, for example, the light emission control section 62 may determine, as the first condition, whether or not a distance between the subject and a background is equal to or smaller than a first distance. Moreover, for example, the light emission control section 62 may determine, as the first condition, whether or not a distance to the subject is equal to or larger than a second distance.

In the case where the first condition is satisfied, the light emission control section 62 determines whether or not the shooting conditions for the subject satisfy a second condition, and in a case where the second condition is satisfied, the flash 22 may emit light at a third timing (a light emission timing 3 in FIG. 18) at which the aperture diaphragm 42 is closed more than at the second timing. In this case, for example, the light emission control section 62 may determine, as the second condition, whether or not a depth of the subject is equal to or larger than the second distance. Moreover, for example, the light emission control section 62 may determine, as the second condition, whether or not a moving amount of the subject is equal to or larger than a predetermined moving amount.

In a case where the light emission control section 62 allows the flash 22 to emit light at the second timing or the third timing, the light emission control section 62 may allow the flash 22 to emit light with a smaller light emission amount than in a case where the flash 22 emits light at the first timing. In other words, as the diaphragm position is located closer to the open side, the light emission amount may be reduced.

A flow of control in a case where the light emission timing of the flash 22 is modulated, based on the shooting conditions will be described in more detail below referring to FIG. 19. Light is allowed to be emitted at a more suitable diaphragm position by modulating the light emission timing, based on the shooting conditions.

It is assumed that an initial light emission timing is set to a state in which the aperture diaphragm 42 is narrowest, such as the light emission timing 1 in FIG. 18. The light emission control section 62 determines whether or not the distance between the subject and the background is equal to or smaller than a predetermined threshold value (step S41). In a case where the distance between the subject and the background is not equal to or smaller than the predetermined threshold value (step S41; N), the light emission control section 62 goes to the next determination step S43. In a case where the distance between the subject and the background is equal to or smaller than the predetermined threshold value (step S41; Y), the light emission control section 62 modulates the light emission timing toward a direction where the aperture diaphragm is opened (step S42). Therefore, for example, the light emission timing is set closer to the open side than the initial light emission timing (for example, the light emission timing 3 in FIG. 18). Thus, the depth of field becomes shallower to stand out the subject more conspicuously.

Next, the light emission control section 62 determines whether or not the depth of the subject is equal to or larger than a predetermined threshold value (step S43). In a case where the depth of the subject is not equal to or larger than the predetermined threshold value (step S43; N), the light emission control section 62 goes to the next determination step S45. In a case where the depth of the subject is equal to or larger than the predetermined threshold value (step S43; Y), the light emission control section 62 modulates the light emission timing toward a direction where the aperture diaphragm is closed (step S44). Thus, the light emission timing is set to, for example, the light emission timing 2 in FIG. 18. Therefore, an image in which the entire subject comes into focus is allowed to be taken.

Next, the light emission control section 62 determines whether or not the moving amount of the subject is equal to or larger than a predetermined threshold value (step S45). In a case where the moving amount of the subject is not equal to or larger than the predetermined threshold value (step S45; N), the light emission control section 62 goes to the next determination step S47. In a case where the moving amount of the subject is equal to or larger than the predetermined threshold value (step S45; Y), the light emission control section 62 modulates the light emission timing toward the direction where the aperture diaphragms is closed (step S46). Thus, the light emission timing is set to, for example, the light emission timing 1 in FIG. 18. Therefore, defocusing due to movement of the subject is prevented.

Next, the light emission control section 62 determines whether or not flash light reaches the subject at present, based on occasions such as a large distance to the subject (step S47). In a case where flash light reaches the subject at present (step S47; N), modulation is finished. In a case where the flash light does not reach the subject at present (step S47; Y), the light emission control section 62 modulates the light emission timing toward the direction where the aperture diaphragm is opened (step S48). Thus, the light emission timing is set to, for example, the light emission timing 2 or the light emission timing 3 in FIG. 18. Whether or not flash light reaches the subject may be determined by not only information about the distance to the subject, but also the aperture value, a gain, a maximum Gno of the flash 22, and the like. In a case where flash light does not reach the subject, the flash light is controlled to reach the subject by modulating the light emission timing toward the direction where the aperture diaphragm is opened.

Specific examples of the threshold values used in the above-described determination steps S41, S43, S45, and S47 are illustrated in Table 1. Only threshold values of dominant shooting conditions in respective determination steps are illustrated. The influence degrees of respective conditions on determination when the light emission timing is modulated are decreased in order of determination steps S47, S45, S43, and S41.

TABLE 1

| Determination Step | Shooting Condition | | | | | Threshold Determination Value |
|---|---|---|---|---|---|---|
| | Effective F-number | ISO Value | Max Gno of Flash | Focal Length of Lens | Distance to Subject | |
| S41 | F3.5 | — | — | 50 mm | 2 m | Distance between Subject and Background: 1 m |
| S43 | F3.5 | — | — | 50 mm | 2 m | Depth of Subject: 50 cm |
| S45 | F3.5 | — | — | 50 mm | 2 m | Moving amount of Subject: 2.5 m/sec |
| S47 | F5.6 | ISO100 | Gno56 | — | 2 m | Distance to Subject: 10 m |

Moreover, typical examples of a way of obtaining information used in each determination step are as follows. The distance between the subject and the background used in the determination step S41 is allowed to be obtained, based on pre-flash, an image plane phase difference pixel, lens distance information, and the like. The depth of the subject used in the determination step S43 is allowed to be obtained, based on pre-flash, the image plane phase difference pixel, and the like. The moving amount of the subject used in the determination step S43 is allowed to be obtained, based on the image plane phase difference pixel, lens information, subject recognition information, color information, edge information, a motion vector, and the like. The pre-flash is preliminary light emission for calculation of a light emission amount for shooting. The image plane phase difference pixel is a pixel provided to the image pickup device 44 for phase difference AF. Moreover, merits and demerits by a difference in a distance detection method are illustrated in Table 2.

TABLE 2

| Distance Detection Method | Merit | Demerit |
|---|---|---|
| Pre-flash | No influence on image quality of shot image | Reduction in precision in case where subject or background is distant Variation in precision depending on reflectivity of subject |
| Image Plane Phase Difference Pixel | High precision | Reduction in precision in dark scene Influence on image quality of shot image |
| Lens Distance Information | No influence on image quality of shot image | Variation in precision depending on lens kind |

3.2 Effects

As described above, in this embodiment, the aperture diaphragm 42 is variably controlled between the first diaphragm position and the second diaphragm position at which the aperture diaphragm is closed more than at the first diaphragm position, and the flash emits light at the first timing at which the aperture diaphragm 42 is closed to the second diaphragm position in the exposure section; therefore, the apodization effect is allowed to be obtained, and the flash is allowed to emit light at an optimum timing. Moreover, the flash light emission timing is modulated according to the shooting conditions; therefore, the flash is allowed to emit light at an optimum timing according to the shooting conditions.

4-1. Other Embodiments 1

The technology of the present disclosure is not limited to the above-described embodiments, and may be variously modified.

For example, the technology of the present disclosure may have the following configurations.

(1) An image processing apparatus, including circuitry configured to cause an aperture diaphragm to move from a starting position toward first and second diaphragm positions of the aperture diaphragm such that the aperture diaphragm reaches the first diaphragm position at the beginning of an exposure period, and cause the aperture diaphragm to move from the first diaphragm position to the second diaphragm position during the exposure period.

(2). The image processing apparatus of feature (1), in which the first diaphragm position is predetermined.

(3) The image processing apparatus of features (1) or (2), in which the circuitry is further configured to cause the aperture diaphragm to move to the starting position before causing the aperture diaphragm to move from the starting position.

(4) The image processing apparatus of any of features (1) to (3), in which the circuitry is configured to cause the aperture diaphragm to move to the starting position and away from the second diaphragm position.

(5) The image processing apparatus of any of features (1) to (4), in which the circuitry is further configured to determine which of the first diaphragm position and the second diaphragm position an initial position of the aperture diaphragm is closest to, and determine the starting position based on the determination of which of the first diaphragm position and the second diaphragm position is closest to the initial position.

(6) The image processing apparatus of feature (5), in which the initial position is between the first and second diaphragm positions.

(7) The image processing apparatus of any of features (1) to (6), in which the circuitry is configured to cause the aperture diaphragm to continuously move from the starting position to the first diaphragm position and the second diaphragm position without interruption.

(8) The image processing apparatus of any of features (1) to (7), in which the aperture diaphragm moves from the starting position to the first diaphragm position at a first speed and from the first diaphragm position to the second diaphragm position at a second speed, which is different from the first speed.

(9) The image processing apparatus of feature (8), in which the second speed is greater than the first speed.

(10) The image processing apparatus of any of features (1) to (9), in which the aperture diaphragm moves in a closing direction from the starting position toward the first and second diaphragm positions.

(11) The image processing apparatus of any of features (1) to (10), in which the aperture diaphragm moves in an opening direction from the starting position toward the first and second diaphragm positions.

(12) The image processing apparatus of any of features (1) to (11), in which the circuitry is further configured to determine the exposure period for capturing an image.

(13) The image processing apparatus of any of features (1) to (12), in which the exposure period is used to capture an image.

(14) An image processing system, including circuitry configured to cause an aperture diaphragm to move from a starting position toward first and second diaphragm positions of the aperture diaphragm such that the aperture diaphragm reaches the first diaphragm position at the beginning of an exposure period, and cause the aperture diaphragm to move from the first diaphragm position to the second diaphragm position during the exposure period.

(15) A method of an image processing apparatus for image capture, the method including causing, by circuitry of the image processing apparatus, an aperture diaphragm to move from a starting position toward first and second diaphragm positions of the aperture diaphragm such that the aperture diaphragm reaches the first diaphragm position at the beginning of an exposure period; and causing, by the circuitry, the aperture diaphragm to move from the first diaphragm position to the second diaphragm position during the exposure period.

(16) A non-transitory computer-readable storage medium storing a program, which when executed by a computer, causes the computer to perform the method of feature (15).

(17) A lens, including circuitry configured to cause an aperture diaphragm to move from a starting position toward first and second diaphragm positions of the aperture diaphragm such that the aperture diaphragm reaches the first diaphragm position at the beginning of an exposure period, and cause the aperture diaphragm to move from the first diaphragm position to the second diaphragm position during the exposure period.

4-2. Other Embodiments 2

The technology of the present disclosure may have the following configurations.

(1) An exposure control unit including:

an aperture control section configured to move a diaphragm position of an aperture diaphragm from a first diaphragm position to a second diaphragm position in an exposure section based on an exposure start timing, in which the aperture control section acceleratingly moves, before the exposure start timing, the diaphragm position of the aperture diaphragm in a same direction as a direction where the diaphragm position moves in the exposure section to bring the diaphragm position of the aperture diaphragm closer to the first diaphragm position.

(2) The exposure control unit according to (1), in which the second diaphragm position is a diaphragm position located closer to an open side than the first diaphragm position, and the aperture control section temporarily moves, before the exposure start timing, the diaphragm position of the aperture diaphragm to a third diaphragm position at which an aperture diaphragm is closed more than at the first diaphragm position, then acceleratingly moves the diaphragm position of the aperture diaphragm from the third diaphragm position to bring the diaphragm position of the aperture diaphragm closer to the first diaphragm position, and after that, the aperture control section moves the diaphragm position of the aperture diaphragm from the first diaphragm position to the second diaphragm position in the exposure section.

(3) The exposure control unit according to (1), in which the second diaphragm position is a diaphragm position at which the aperture diaphragm is closed more than at the first diaphragm position, and the aperture control section acceleratingly moves, before the exposure start timing, the diaphragm position of the aperture diaphragm from a diaphragm position located closer to an open side than the first diaphragm position to bring the diaphragm position of the aperture diaphragm closer to the first diaphragm position, and after that, the aperture control section moves the diaphragm position of the aperture diaphragm from the first diaphragm position to the second diaphragm position.

(4) The exposure control unit according to any one of (1) to (3), further including an exposure control section configured to notify the aperture control section of the exposure start timing with use of a predetermined synchronization signal as a reference, and to variably control a driving start time of a shutter in an image pickup unit, based on the notified exposure start timing.

(5) The exposure control unit according to (4), in which the aperture control section acceleratingly moves the diaphragm position of the aperture diaphragm to allow the diaphragm position of the aperture diaphragm to be located at the first diaphragm position at the exposure start timing notified by the exposure control section.

(6) The exposure control unit according to (4) or (5), in which the image pickup unit is a lens-interchangeable camera including an interchangeable lens section provided with the aperture diaphragm, and the aperture control section is provided to the lens section.

(7) An exposure controlling method, the method including:

acceleratingly moving, before an exposure start timing, a diaphragm position of an aperture diaphragm in a same direction as a direction where the diaphragm position moves in an exposure section based on the exposure start timing by an aperture control section to bring the diaphragm position of the aperture diaphragm closer to a first diaphragm position; and moving the diaphragm position of the aperture diaphragm from the first diaphragm position to a second diaphragm position in the exposure section by the aperture control section.

(8) An image pickup unit including:

an aperture control section configured to move a diaphragm position of an aperture diaphragm from a first diaphragm position to a second diaphragm position in an exposure section based on an exposure start timing, in which the aperture control section acceleratingly moves, before the exposure start timing, the diaphragm position of the aperture diaphragm in a same direction as a direction where the diaphragm position moves in the exposure section to bring the diaphragm position of the aperture diaphragm closer to the first diaphragm position.

It should be understood by those skilled in the art that various modifications, combinations, sub-combinations, and alterations may occur depending on design requirements and other factors insofar as they are within the scope of the appended claims or the equivalents thereof.

What is claimed is:

1. An image processing apparatus, comprising:
   circuitry configured to
   cause an aperture diaphragm to move from a starting position toward first and second diaphragm positions of the aperture diaphragm such that the aperture diaphragm reaches the first diaphragm position at the beginning of an exposure period, and
   cause the aperture diaphragm to move from the first diaphragm position to the second diaphragm position during the exposure period;
   wherein the aperture diaphragm moves from the starting position to the first diaphragm position at a first speed and from the first diaphragm position to the second diaphragm position at a second speed, which is different from the first speed.

2. The image processing apparatus according to claim 1, wherein the first diaphragm position is predetermined.

3. The image processing apparatus according to claim 1, wherein the circuitry is further configured to
   cause the aperture diaphragm to move to the starting position before causing the aperture diaphragm to move from the starting position.

4. The image processing apparatus according to claim 3, wherein the circuitry is configured to
   cause the aperture diaphragm to move to the starting position and away from the second diaphragm position.

5. The image processing apparatus according to claim 1, wherein the circuitry is further configured to
   determine which of the first diaphragm position and the second diaphragm position an initial position of the aperture diaphragm is closest to, and
   determine the starting position based on the determination of which of the first diaphragm position and the second diaphragm position is closest to the initial position.

6. The image processing apparatus according to claim 5, wherein the initial position is between the first and second diaphragm positions.

7. The image processing apparatus according to claim 1, wherein the circuitry is configured to
   cause the aperture diaphragm to continuously move from the starting position to the first diaphragm position and the second diaphragm position without interruption.

8. The image processing apparatus according to claim 1, wherein the second speed is greater than the first speed.

9. The image processing apparatus according to claim 1, wherein the aperture diaphragm moves in a closing direction from the starting position toward the first and second diaphragm positions.

10. The image processing apparatus according to claim 1, wherein the aperture diaphragm moves in an opening direction from the starting position toward the first and second diaphragm positions.

11. The image processing apparatus according to claim 1, wherein the circuitry is further configured to determine the exposure period for capturing an image.

12. The image processing apparatus according to claim 1, wherein the exposure period is used to capture an image.

13. An image processing system, comprising:
   circuitry configured to
   cause an aperture diaphragm to move from a starting position toward first and second diaphragm positions of the aperture diaphragm such that the aperture diaphragm reaches the first diaphragm position at the beginning of an exposure period, and
   cause the aperture diaphragm to move from the first diaphragm position to the second diaphragm position during the exposure period;
   wherein the aperture diaphragm moves from the starting position to the first diaphragm position at a first speed and from the first diaphragm position to the second diaphragm position at a second speed, which is different from the first speed.

14. A method of an image processing apparatus for image capture, the method comprising:
   causing, by circuitry of the image processing apparatus, an aperture diaphragm to move from a starting position toward first and second diaphragm positions of the aperture diaphragm such that the aperture diaphragm reaches the first diaphragm position at the beginning of an exposure period; and
   causing, by the circuitry, the aperture diaphragm to move from the first diaphragm position to the second diaphragm position during the exposure period;
   wherein the aperture diaphragm moves from the starting position to the first diaphragm position at a first speed and from the first diaphragm position to the second diaphragm position at a second speed, which is different from the first speed.

15. A lens, comprising:
   circuitry configured to
   cause an aperture diaphragm to move from a starting position toward first and second diaphragm positions of the aperture diaphragm such that the aperture diaphragm reaches the first diaphragm position at the beginning of an exposure period, and
   cause the aperture diaphragm to move from the first diaphragm position to the second diaphragm position during the exposure period;
   wherein the aperture diaphragm moves from the starting position to the first diaphragm position at a first speed and from the first diaphragm position to the second diaphragm position at a second speed, which is different from the first speed.

* * * * *